(12) United States Patent
Quirk

(10) Patent No.: US 10,966,498 B1
(45) Date of Patent: Apr. 6, 2021

(54) LUGGAGE WITH EXTENDABLE DOLLY

(71) Applicant: Katherine Quirk, Fairbanks, AK (US)

(72) Inventor: Katherine Quirk, Fairbanks, AK (US)

( * ) Notice: Subject to any disclaimer, the term of this patent is extended or adjusted under 35 U.S.C. 154(b) by 288 days.

(21) Appl. No.: 16/043,381

(22) Filed: Jul. 24, 2018

(51) Int. Cl.
| | | |
|---|---|---|
| *A45C 13/38* | (2006.01) | |
| *B62B 3/02* | (2006.01) | |
| *B62B 5/06* | (2006.01) | |
| *A45C 5/14* | (2006.01) | |
| *A45C 13/26* | (2006.01) | |
| *A45C 5/03* | (2006.01) | |
| *A45C 9/00* | (2006.01) | |
| *A45C 13/00* | (2006.01) | |

(52) U.S. Cl.
CPC .............. *A45C 13/385* (2013.01); *A45C 5/03* (2013.01); *A45C 5/14* (2013.01); *A45C 5/146* (2013.01); *A45C 9/00* (2013.01); *A45C 13/262* (2013.01); *B62B 3/02* (2013.01); *B62B 5/06* (2013.01); *A45C 13/001* (2013.01); *A45C 2005/148* (2013.01); *A45C 2009/007* (2013.01); *A45C 2013/267* (2013.01); *B62B 2202/24* (2013.01)

(58) Field of Classification Search
CPC ..... A45C 5/14; A45C 5/146; A45C 2005/148; A45C 13/001; A45C 13/38; A45C 13/385; A45C 2009/007; A45C 9/00; B62B 3/00
USPC .............................. 190/15.1, 18 A; 280/47.28
See application file for complete search history.

(56) References Cited

U.S. PATENT DOCUMENTS

| | | | |
|---|---|---|---|
| 4,036,336 A | 7/1977 | Burtley | |
| 5,230,408 A | 7/1993 | Sadow | |
| 7,870,937 B1 | 1/2011 | Arnao | |
| D638,190 S | 5/2011 | Spann | |
| 8,256,242 B1 * | 9/2012 | Evans | A45C 13/262 62/457.7 |
| 8,282,113 B2 | 10/2012 | Veal | |
| 8,517,398 B1 * | 8/2013 | Wilson | B62B 1/12 280/37 |
| 9,332,852 B1 * | 5/2016 | Milich | A47C 13/00 |
| 2005/0098402 A1 | 5/2005 | Cohen | |
| 2005/0156002 A1 * | 7/2005 | Neal | B62B 3/02 224/485 |
| 2008/0217130 A1 | 9/2008 | Louis | |
| 2009/0315284 A1 * | 12/2009 | Osorno | A45C 5/14 280/37 |
| 2014/0190780 A1 | 7/2014 | Blazure | |
| 2015/0208776 A1 | 7/2015 | Bennett | |
| 2018/0098609 A1 * | 4/2018 | Kim | B62B 3/008 |

FOREIGN PATENT DOCUMENTS

CA        2095893        11/1993

* cited by examiner

*Primary Examiner* — James N Smalley
*Assistant Examiner* — Jennifer Castriotta

(57) ABSTRACT

The luggage with extendable dolly is a luggage item. The luggage with extendable dolly comprises a suitcase with rolling telescopic platform. The luggage with extendable dolly forms a cart used to transport additional luggage items. The rolling telescopic platform is collapsible such that the suitcase can store the rolling telescopic platform within the exterior surfaces of the suitcase.

14 Claims, 6 Drawing Sheets

LUGGAGE WITH EXTENDABLE DOLLY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation including hand-propelled vehicles, more specifically, luggage including suitcases. (B62B2202/24)

SUMMARY OF INVENTION

The luggage with extendable dolly is a luggage item. The luggage with extendable dolly comprises a suitcase with rolling telescopic platform. The luggage with extendable dolly forms a cart used to transport additional luggage items. The rolling telescopic platform is collapsible such that the suitcase can store the rolling telescopic platform within the exterior surfaces of the suitcase.

These together with additional objects, features and advantages of the luggage with extendable dolly will be readily apparent to those of ordinary skill in the art upon reading the following detailed description of the presently preferred, but nonetheless illustrative, embodiments when taken in conjunction with the accompanying drawings.

In this respect, before explaining the current embodiments of the luggage with extendable dolly in detail, it is to be understood that the luggage with extendable dolly is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the luggage with extendable dolly.

It is therefore important that the claims be regarded as including such equivalent construction insofar as they do not depart from the spirit and scope of the luggage with extendable dolly. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
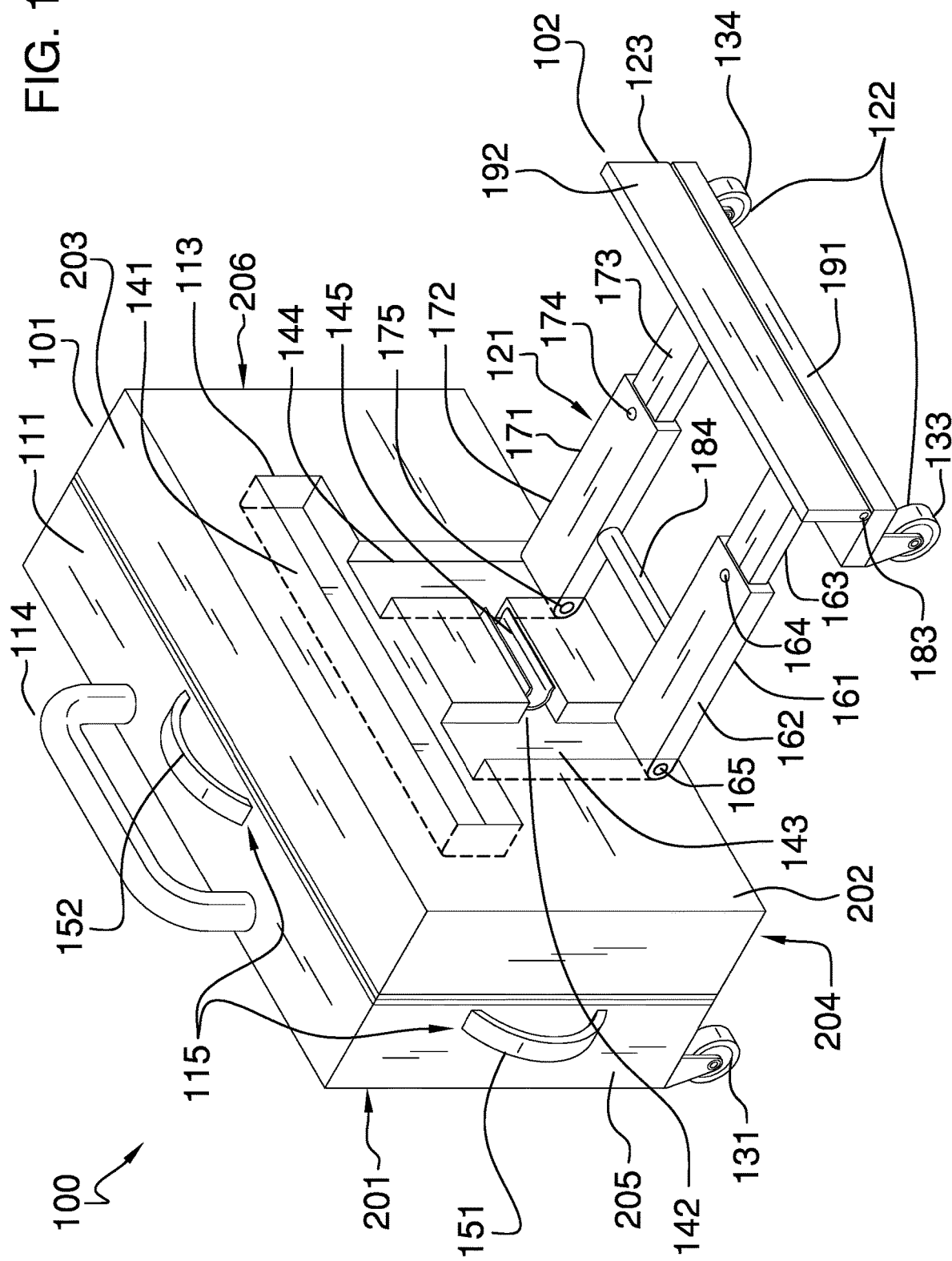
FIG. 1 is a perspective view of an embodiment of the disclosure.
Figure 2:
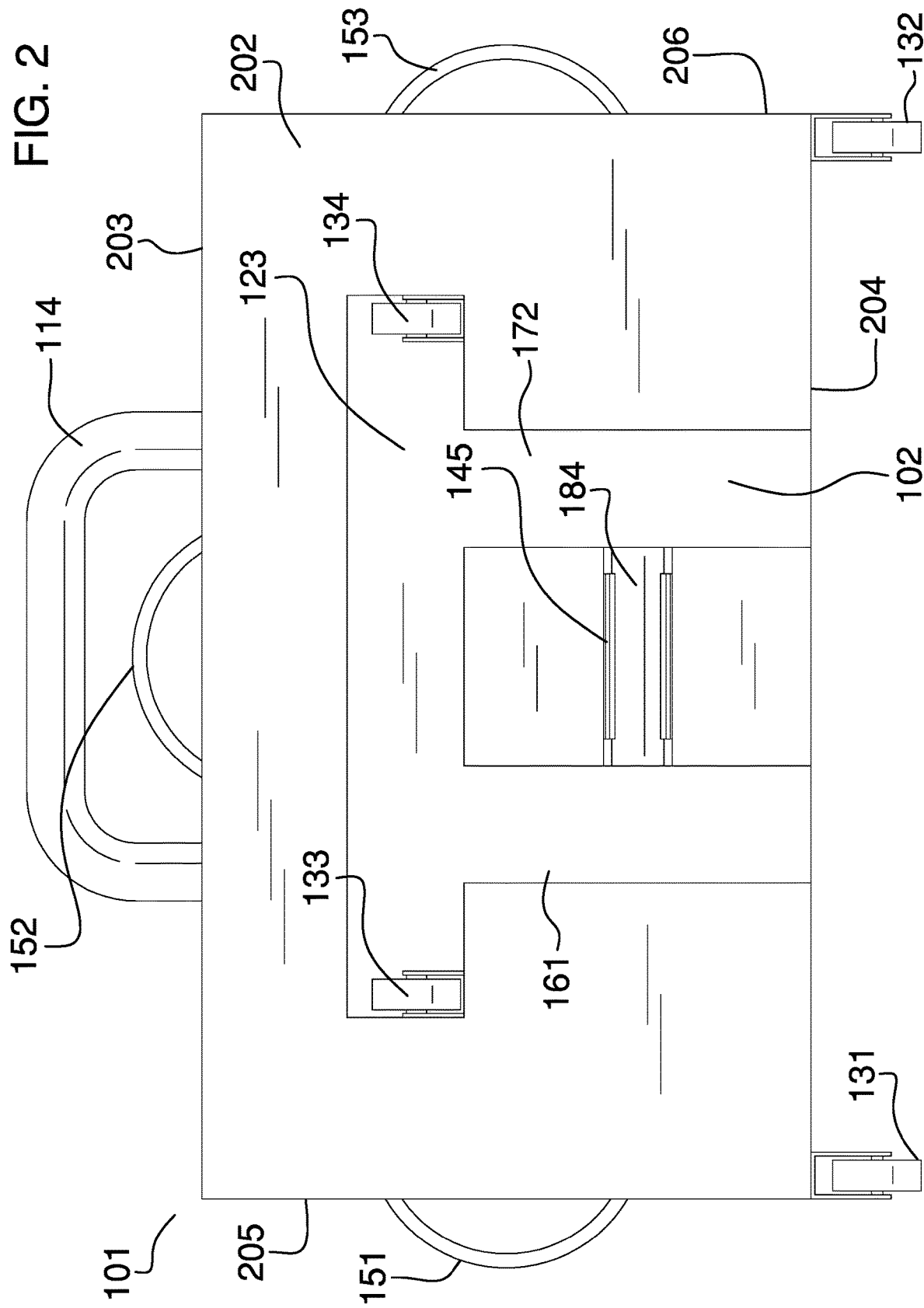
FIG. 2 is a front view of an embodiment of the disclosure.
Figure 3:
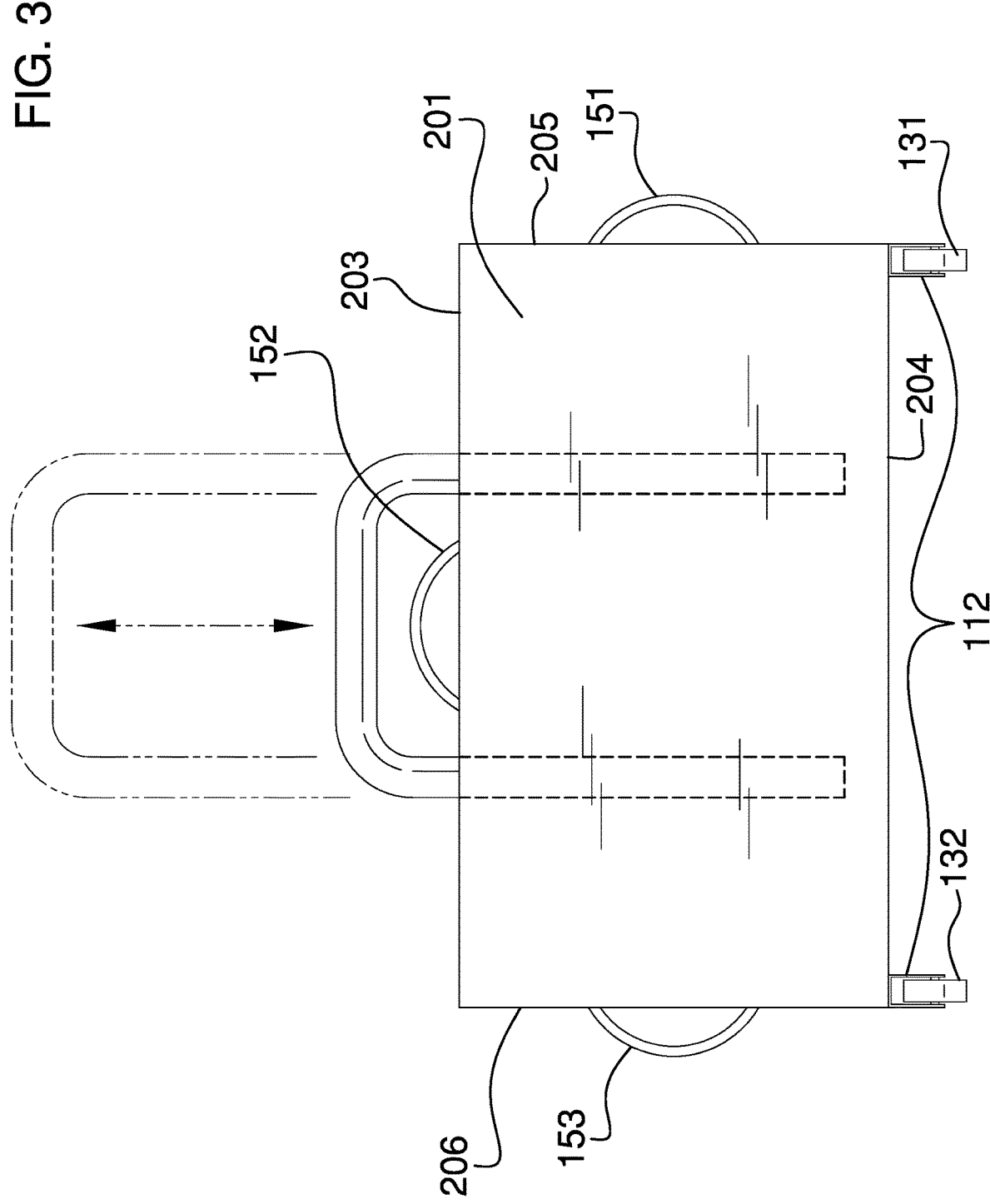
FIG. 3 is a front view of an embodiment of the disclosure.
Figure 4:
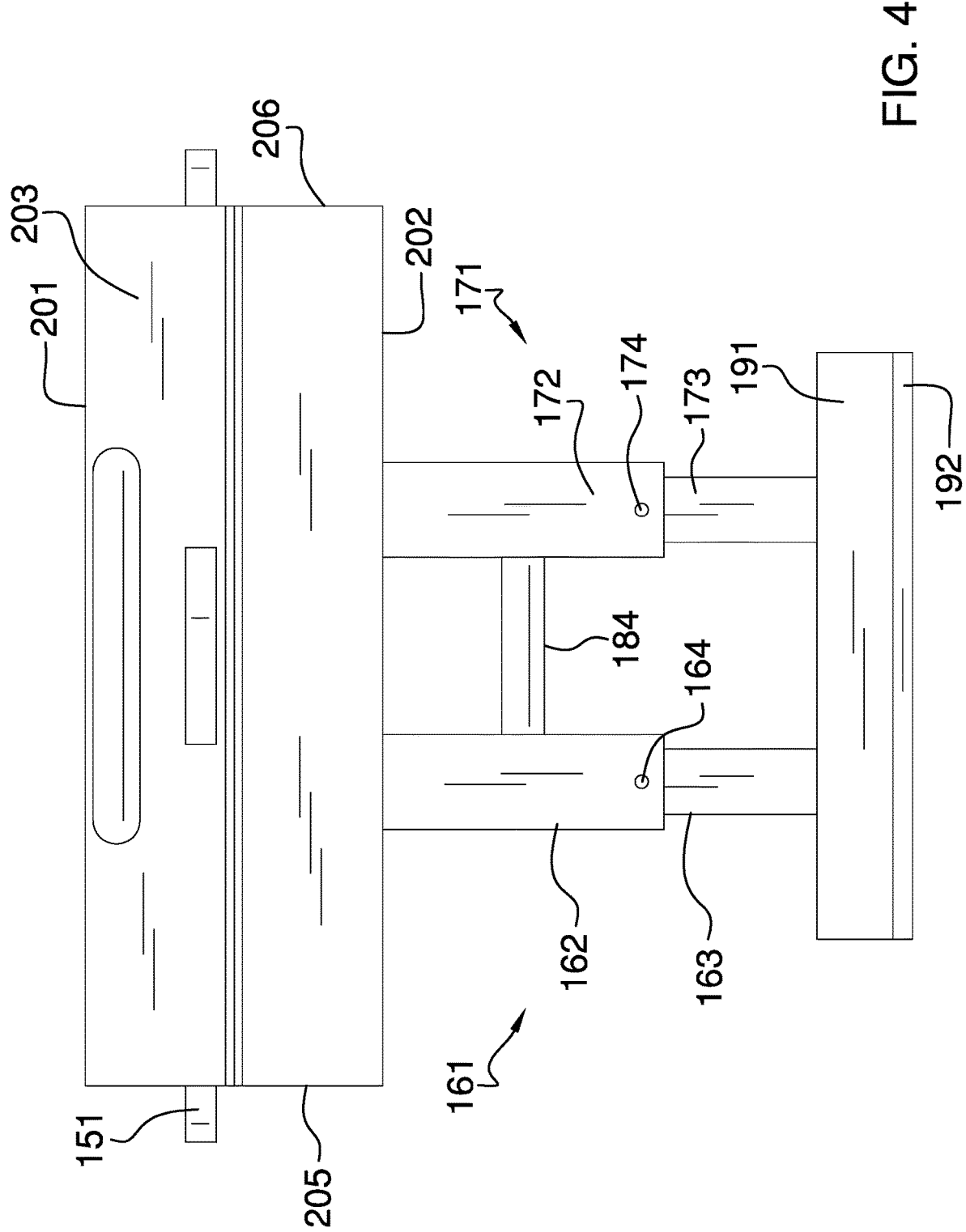
FIG. 4 is a top view of an embodiment of the disclosure.
Figure 5:
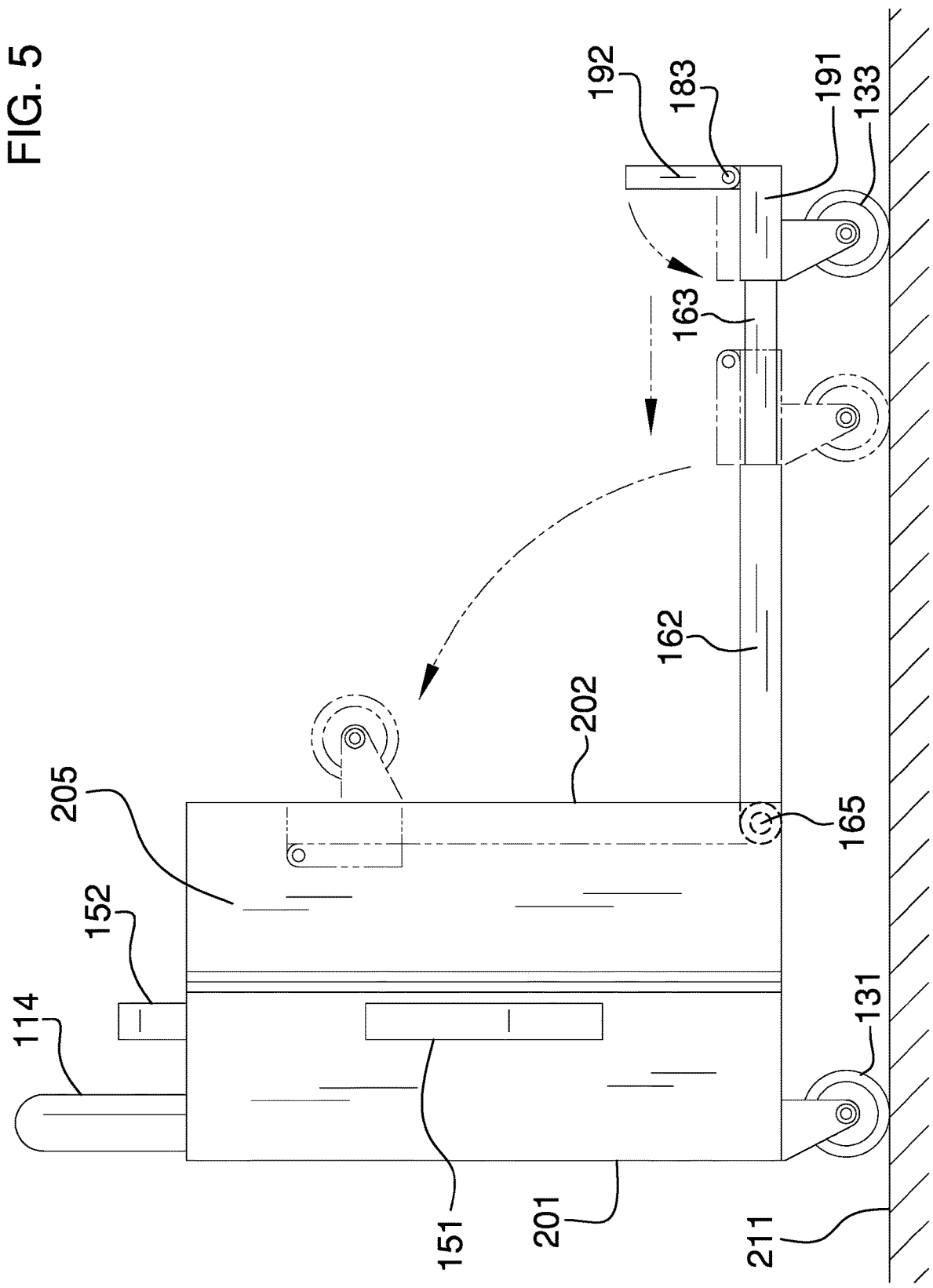
FIG. 5 is a side view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The luggage with extendable dolly 100 (hereinafter invention) is a luggage item. The invention 100 comprises a suitcase 101 with rolling telescopic platform 102. The invention 100 forms a cart used to transport additional luggage items. The rolling telescopic platform 102 is collapsible such that the suitcase 101 can store the rolling telescopic platform 102 within the exterior surfaces of the suitcase 101.

The suitcase 101 is a luggage item. The suitcase 101 is a hollow rectangular structure. The suitcase 101 is configured to store domestic articles during travel. The suitcase 101 comprises a shell 111, a first plurality of casters 112, a stowing berth 113, an extendable handle 114, and a plurality of fixed handles 115.

The shell 111 is a hollow rectangular block structure that forms the containment space of the suitcase 101. The shell 111 is a semi-rigid structure with an elastic nature. The shell 111 forms the exterior surfaces of the suitcase 101. The shell 111 contains the collapsed rolling telescopic platform 102. The shell 111 comprises an anterior face 201, a posterior face 202, a superior face 203, an inferior face 204, a port face 205, and a starboard face 206.

Each of the first plurality of casters 112 is a caster attached to the inferior face 204 of the shell 111. The first plurality of casters 112 allow the suitcase 101 to roll along a supporting surface 211 during transport. Each of the first plurality of casters 112 are identical. Each of the first plurality of casters 112 are commercially available. The first plurality of casters 112 comprises a first caster 131 and a second caster 132.

The first caster 131 is a commercially available caster. The first caster 131 mounts on the inferior face 204 of the suitcase 101 such that the first caster 131 is equidistant from both the anterior face 201 and the port face 205 of the suitcase 101. The second caster 132 is a commercially available caster. The second caster 132 mounts on the inferior face 204 of the suitcase 101 such that the second caster 132 is equidistant from both the anterior face 201 and the starboard face 206 of the suitcase 101.

The stowing berth 113 is a negative space formed in the posterior face 202 of the shell 111. The stowing berth 113 forms a cavity that is sized to receive and store the collapsed rolling telescopic platform 102 when the rolling telescopic platform 102 is not in use. The stowing berth 113 comprises a first lateral slot 141, a second lateral slot 142, a first longitudinal slot 143, a second longitudinal slot 144, and a clip 145.

The first lateral slot 141 is a negative space that forms a portion of the stowing berth 113 formed in the posterior face 202 of the shell 111. The first lateral slot 141 is a rectangularly shaped structure. The first lateral slot 141 is positioned such that the major axis of the first lateral slot 141 is perpendicular to both the port face 205 and the starboard face 206 of the shell 111. The first lateral slot 141 is sized and positioned such that the aft guard 123 will insert in the first lateral slot 141.

The second lateral slot 142 is a negative space that forms a portion of the stowing berth 113 formed in the posterior face 202 of the shell 111. The second lateral slot 142 is a rectangularly shaped structure. The second lateral slot 142 is positioned such that the major axis of the second lateral slot 142 is perpendicular to both the port face 205 and the starboard face 206 of the shell 111. The second lateral slot 142 is sized and positioned such that the cross brace 184 will insert in the second lateral slot 142.

The first longitudinal slot 143 is a negative space that forms a portion of the stowing berth 113 formed in the posterior face 202 of the shell 111. The first longitudinal slot 143 is a rectangularly shaped structure. The first longitudinal slot 143 is positioned such that the major axis of the first longitudinal slot 143 is perpendicular to both the superior face 203 and the inferior face 204 of the shell 111. The first longitudinal slot 143 is sized and positioned such that the first telescopic beam 161 will insert in the first longitudinal slot 143 when in a collapsed state.

The second longitudinal slot 144 is a negative space that forms a portion of the stowing berth 113 formed in the posterior face 202 of the shell 111. The second longitudinal slot 144 is a rectangularly shaped structure. The second longitudinal slot 144 is positioned such that the major axis of the second longitudinal slot 144 is perpendicular to both the superior face 203 and the inferior face 204 of the shell 111. The second longitudinal slot 144 is sized and positioned such that the second telescopic beam 171 will insert in the second longitudinal slot 144 when in a collapsed state.

The clip 145 is a cantilever V spring. The clip 145 mounts in the second lateral slot 142 such that the cross brace 184 inserts into the clip 145 when the collapsed rolling telescopic platform 102 is stored in the stowing berth 113. The cli 145 acts as a torsion spring that holds the cross brace 184 in position when the rolling telescopic platform 102 is in a collapsed and stowed position. The clip 145 prevents the rolling telescopic platform 102 from inadvertently deploying when stored.

The extendable handle 114 is a grip that is accessible from the exterior of the shell 111. The extendable handle 114 is adjustable such that the extendable handle 114 retracts into and extends from the superior face 203 of the shell 111. The extendable handle 114 allows for the manual manipulation and transport of the invention 100. The use of an extendable handle 114 is well-known and documented in the travel arts.

Each of the plurality of fixed handles 115 is a loop. Each of the plurality of fixed handles 115 forms a grip used for the manual manipulation and transport of the invention 100. Each of the plurality of fixed handles 115 attaches to a face of the suitcase 101 selected from the group consisting of the superior face 203, the port face 205, and the starboard face 206. The plurality of fixed handles 115 comprises a first fixed handle 151, a second fixed handle 152, and a third fixed handle 153.

The first fixed handle 151 is a loop structure that mounts on the port face 205 of the shell 111. The first fixed handle 151 is a grip that allows for the manipulation and transport of the invention 100. The second fixed handle 152 is a loop structure that mounts on the superior face 203 of the shell 111. The second fixed handle 152 is a grip that allows for the manipulation and transport of the invention 100. The third fixed handle 153 is a loop structure that mounts on the starboard face 206 of the shell 111. The third fixed handle 153 is a grip that allows for the manipulation and transport of the invention 100.

The rolling telescopic platform 102 is a dolly. The rolling telescopic platform 102 attaches to the suitcase 101. The rolling telescopic platform 102 is a telescopic structure. When extended, the rolling telescopic platform 102 forms a cart capable of transporting additional items of luggage in addition to the suitcase 101. When collapsed, the rolling telescopic platform 102 is stored within the exterior surfaces of the suitcase 101. The rolling telescopic platform 102 comprises a supporting frame 121, a second plurality of casters 122, and an aft guard 123.

The supporting frame 121 forms the telescopic structure of the rolling telescopic platform 102. The supporting frame 121 creates a horizontal surface upon which additional luggage is placed during transport. The supporting frame 121 supports the additional luggage above the supporting surface 211 such that the additional luggage can roll with the suitcase 101. The supporting frame 121 comprises a first telescopic beam 161, a second telescopic beam 171, a cross brace 184, a first hinge 165, and a second hinge 175.

The first telescopic beam 161 forms a portion of the horizontal supporting structure formed by the supporting frame 121 used to support the additional luggage transported by the invention 100. The span of the length of the first telescopic beam 161 is adjustable.

The first telescopic beam 161 further comprises a first arm 162, a second arm 163 and a first detent 164. The first detent 164 connects the second arm 163 to the first arm 162. The first arm 162 is a hollow first prism that is further defined with an inner dimension. The second arm 163 is a second prism that is further defined with an outer dimension. The first arm 162 and the second arm 163 are geometrically similar. The outer dimension of the second arm 163 is less than the inner dimension of the first arm 162 such that the second arm 163 can be inserted into the first arm 162 in a telescopic manner. This telescopic arrangement of the first telescopic beam 161 allows the length of the first telescopic beam 161 to adjust by adjusting the relative position of the second arm 163 within the first arm 162.

The position of the second arm 163 relative to the first arm 162 is held in position using the first detent 164. The first detent 164 is a mechanical device that connects and secures the first arm 162 to the second arm 163. The first detent 164 is selected from the group consisting of a cotter pin, a G snap collar, a cam lock collar, a threaded clutch, a split collar lock, or a spring loaded ball lock.

The second telescopic beam 171 forms a portion of the horizontal supporting structure formed by the supporting frame 121 used to support the additional luggage transported by the invention 100. The span of the length of the second telescopic beam 171 is adjustable.

The second telescopic beam 171 further comprises a third arm 172, a fourth arm 173 and a second detent 174. The second detent 174 connects the fourth arm 173 to the third arm 172. The third arm 172 is a hollow first prism that is further defined with an inner dimension. The fourth arm 173 is a second prism that is further defined with an outer dimension. The third arm 172 and the fourth arm 173 are geometrically similar. The outer dimension of the fourth arm 173 is less than the inner dimension of the third arm 172 such that the fourth arm 173 can be inserted into the third arm 172 in a telescopic manner. This telescopic arrangement of the second telescopic beam 171 allows the length of the second telescopic beam 171 to adjust by adjusting the relative position of the fourth arm 173 within the third arm 172.

The position of the fourth arm 173 relative to the third arm 172 is held in position using the second detent 174. The second detent 174 is a mechanical device that connects and secures the third arm 172 to the fourth arm 173. The second detent 174 is selected from the group consisting of a cotter pin, a G snap collar, a cam lock collar, a threaded clutch, a split collar lock, or a spring loaded ball lock.

The first hinge 165 is a commercially available pivoting fastener that attaches the first arm 162 of the first telescopic beam 161 to the shell 111. The first hinge 165 attaches the first arm 162 in the stowing berth 113 at the brink formed by the posterior face 202 and the inferior face 204 of the shell 111 such that the rolling telescopic platform 102 rotates into and out of the stowing berth 113.

The second hinge 175 is a commercially available pivoting fastener that attaches the third arm 172 of the second telescopic beam 171 to the shell 111. The second hinge 175 attaches the third arm 172 in the stowing berth 113 at the brink formed by the posterior face 202 and the inferior face 204 of the shell 111 such that the rolling telescopic platform 102 rotates into and out of the stowing berth 113.

The cross brace 184 is a shaft that attaches the first arm 162 of the first telescopic beam 161 to the third arm 172 of the second telescopic beam 171.

Each of the second plurality of casters 122 is a caster attached to the aft guard 123. The second plurality of casters 122 allow the rolling telescopic platform 102 and the suitcase 101 to roll along a supporting surface 211 during transport. Each of the second plurality of casters 122 are identical. Each of the second plurality of casters 122 are identical to each of the first plurality of casters 112. Each of the second plurality of casters 122 are commercially available. The second plurality of casters 122 comprises a third caster 133 and a fourth caster 134.

The third caster 133 is a commercially available caster. The third caster 133 mounts on the inferior face of the lateral plate 191 such that the third caster 133 is between the port side of the lateral plate 191 and the fourth caster 134. The fourth caster 134 is a commercially available caster. The fourth caster 134 mounts on the inferior face of the lateral plate 191 such that the fourth caster 134 is between the starboard side of the lateral plate 191 and the third caster 133.

The aft guard 123 is the structure of the rolling telescopic platform 102 that is distal from the anterior face 201 of the suitcase 101 when the rolling telescopic platform 102 extends. The aft guard 123 forms a ridge that prevents the additional luggage from sliding off the supporting frame 121 while the invention 100 is moving in the primary sense of direction. The aft guard 123 comprises a lateral plate 191, a longitudinal plate 192, and a hinge spring 193. The aft guard 123 attaches to the ends of the second arm 163 and the fourth arm 173 that are distal from the shell 111.

The third hinge 183 is a commercially available pivoting fastener that attaches the longitudinal plate 192 to the lateral plate 191 such that the longitudinal plate 192 rotates towards and away from the lateral plate 191. The lateral plate 191 is a rectangularly shaped plate that attaches the second plurality of casters 122 to the longitudinal plate 192. The lateral plate 191 attaches to the second arm 163 of the first telescopic beam 161 and the fourth arm 173 of the second telescopic beam 171 such that the major axis of the lateral plate 191 is perpendicular to the center axes of the first telescopic beam 161 and the second telescopic beam 171. The longitudinal plate 192 is a rectangularly shaped plate that forms a ridge that prevents the additional luggage from sliding off the rolling telescopic platform 102.

Figure 6:
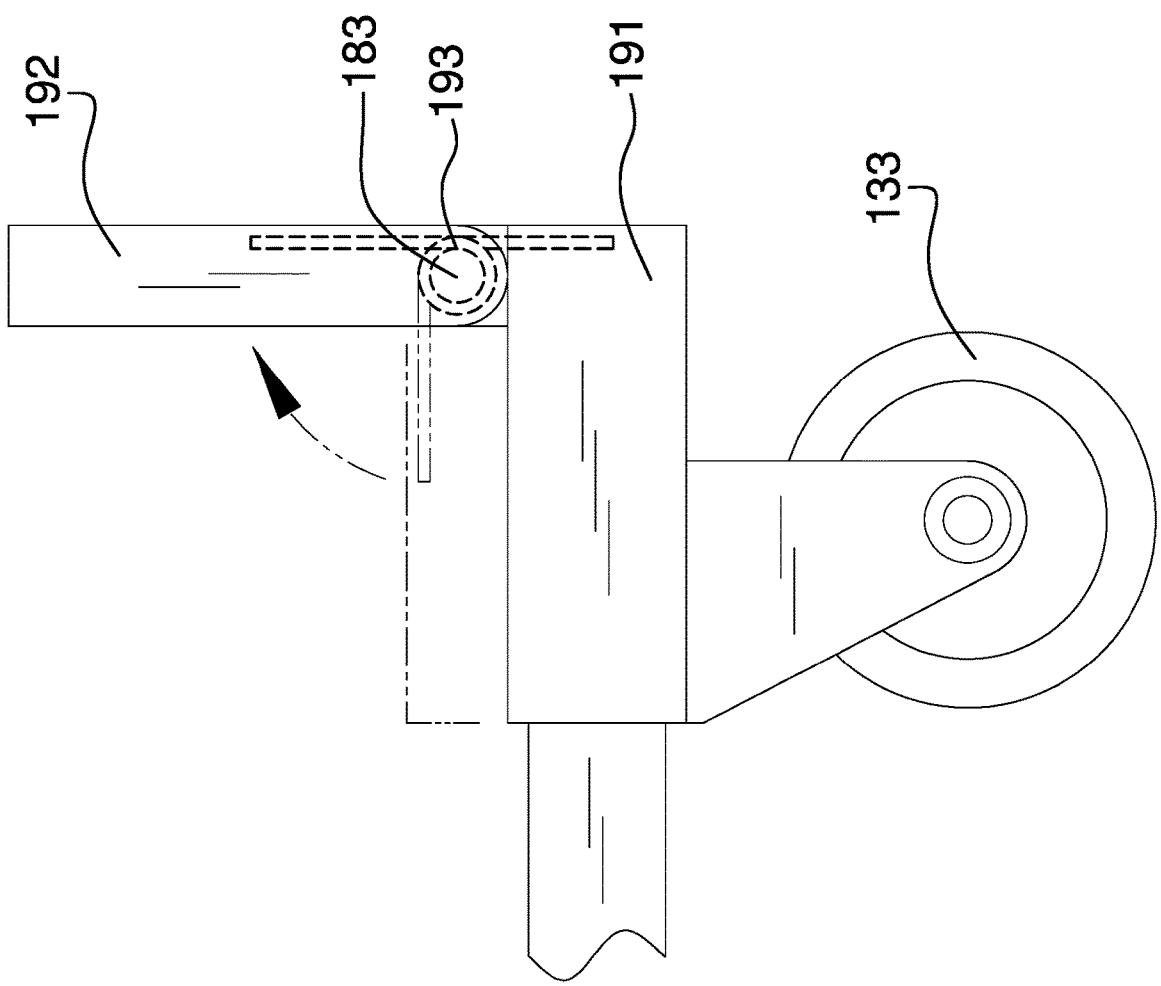
FIG. 6 is a detail view of an embodiment of the disclosure.

As shown most clearly in FIG. 6, the hinge spring 193 is a torsion spring. When the hinge spring 193 is in a relaxed position, the longitudinal plate 192 is perpendicular to the lateral plate 191. When the longitudinal plate 192 rotates around the third hinge 183 such that the face of the longitudinal plate 192 rests against the face of the lateral plate 191 the hinge spring 193 is deformed. The cross brace 184 attaches to the clip 145 of the stowing berth 113 such that the third hinge 183 is held in its deformed shape when the rolling telescopic platform 102 is stored in the stowing berth 113.

The following definitions were used in this disclosure:

Aft: As used in this disclosure, aft is a term that refers to the element of a moving object that is most distal from the anterior surface that faces the primary sense of direction of the vehicle. The term is commonly used on vessels and vehicles.

Anterior: As used in this disclosure, anterior is a term that is used to refer to the front side or direction of a structure. When comparing two objects, the anterior object is the object that is closer to the front of the structure.

Brink: As used in this disclosure, a brink refers to the discontinuous edge or line formed by the intersection of a first plane or surface and a second plane or surface wherein a cant exists between the first plane or surface and the second plane or surface.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Cantilever V Spring: As used in this disclosure, a cantilever V spring is a torsion spring that is formed in a chevron, hyoid or horseshoe shape. The cantilever V spring comprises a first cantilever structure and a second cantilever structure wherein the fixed end of the first cantilever structure is attached to the fixed end of the second cantilever structure. Within this structure, when a force is applied to the cantilever V spring such that the first cantilever structure moves relative to from the second cantilever structure the force deforms the cantilever V spring in an elastic manner that: 1) resists the application of the force; and 2) stores the energy deformation such that when the force is no longer applied the cantilever V spring returns to its relaxed shape. Depending on the application, a cantilever V spring can be considered a torsion spring, a tension spring, or a compression spring.

Cavity: As used in this disclosure, a cavity is an empty space or negative space that is formed within an object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clip: As used in this disclosure, a clip is a fastener that attaches to an object by gripping or clasping the object. A clip is typically spring loaded.

Correspond: As used in this disclosure, the term correspond is used as a comparison between two or more objects wherein one or more properties shared by the two or more objects match, agree, or align within acceptable manufacturing tolerances.

Detent: As used in this disclosure, a detent is a device for positioning and holding a first object relative to a second object such that the position of the first object relative to the second object is adjustable.

Dolly: As used in this disclosure, a dolly refers to a mobile platform, generally mounted on casters, that is used to move a load or an object.

Forward: As used in this disclosure, forward is a term that relates a first object to a second object. When the first object is closer to the bow of a vehicle, the first object is said to be forward of the second object. The term is commonly used on vessels and vehicles. See bow, aft, port, starboard, and stern Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. Always use Correspond and One to One Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Inferior: As used in this disclosure, the term inferior refers to an edge or surface of an object that would commonly be referred to as the bottom of the object.

Inner Dimension: As used in this disclosure, the term inner dimension describes the span from a first inside or interior surface of a container to a second inside or interior surface of a container. The term is used in much the same way that a plumber would refer to the inner diameter of a pipe.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior-posterior axis. Lateral movement is often called sideways movement.

Major and Minor Axes: As used in this disclosure, the major and minor axes refer to a pair of perpendicular axes that are defined within a structure. The length of the major axis is always greater than or equal to the length of the minor axis. The major axis is always the longest diameter of the structure. The major and minor axes intersect at the center of the structure. The major axis is always parallel to an edge of a rectangular or rectilinear structure.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Plate: As used in this disclosure, a plate is a smooth, flat and semi-rigid or rigid structure that has at least one dimension that: a) is of uniform thickness; and b) that appears thin relative to the other dimensions of the object. Plates often have a rectangular or disk like appearance. The face of the plate is a surface of the plate selected from the group consisting of: a) the surface of the plate with the greatest surface area; b) the surface of the plate that is distal from the surface of the plate with the greatest surface area. The edges of the plate comprises the surfaces of the plate that would not be considered faces as defined above. As defined in this disclosure, plates may be made of any material, but are commonly made of metal, plastic, and wood. When made of wood, a plate is often referred to as a board.

Port: As used in this disclosure, port refers to the left side of a vehicle when a viewer is facing towards the primary sense of direction of the vehicle.

Posterior: As used in this disclosure, posterior is a term that is used to refer to the side of an object that is distal or in the opposite direction of the anterior side. When comparing two items, the posterior item is the item that is distal from the front of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rectangular Block: As used in this disclosure, a rectangular block refers to a three-dimensional structure comprising six rectangular surfaces formed at right angles. Within this disclosure, a rectangular block may further comprise rounded edges and corners.

Roll: As used in this disclosure, the term roll refers to the motion of an object that is facilitated by the rotation of one or more wheels or casters.

Rounded: A used in this disclosure, the term rounded refers to the replacement of an apex, vertex, or edge or brink of a structure with a (generally smooth) curvature wherein the concave portion of the curvature faces the interior or center of the structure.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Starboard: As used in this disclosure, starboard refers to the right side of a vehicle when a viewer is facing towards the primary sense of direction of the vehicle.

Superior: As used in this disclosure, the term superior refers to an edge or surface of an object that would commonly be referred to as the top of the object.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Telescopic: As used in this disclosure, telescopic is an adjective that describes an object made of sections that fit or slide into each other such that the object can be made longer or shorter by adjusting the relative positions of the sections.

Torsion Spring: As used in this disclosure, a torsion spring is a mechanical device that stores mechanical energy through an opposing torque when the mechanical device is twisted. The torsion spring will return to its original relaxed shape when the twisting force is removed.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A hand-propelled cart comprising:
wherein the hand-propelled cart comprises a suitcase and a rolling telescopic platform;
wherein the suitcase is a hollow rectangular structure;
wherein the rolling telescopic platform is a dolly;
wherein the rolling telescopic platform is a telescopic structure;
wherein the rolling telescopic platform is collapsible;
wherein the rolling telescopic platform is stored within the exterior surfaces of the suitcase;
wherein the hand-propelled cart is a luggage item;
wherein the hand-propelled cart transports a load in addition to the luggage item;
wherein the suitcase comprises a shell, a first plurality of casters, a stowing berth, an extendable handle, and a plurality of fixed handles;
wherein the stowing berth comprising a first lateral slot, a second lateral slot, a first longitudinal slot, a second longitudinal slot, and a clip;
wherein the rolling telescopic platform comprises a supporting frame, a second plurality of casters, and an aft guard;
wherein the second plurality of casters attach to the aft guard;
wherein the supporting frame attaches the aft guard to the suitcase;
wherein the supporting frame comprises a first telescopic beam, a second telescopic beam, a cross brace, a first hinge, and a second hinge;
wherein the first lateral slot is sized and positioned such that the aft guard will insert in the first lateral slot;
wherein the second lateral slot is sized and positioned such that the cross brace will insert in the second lateral slot;
wherein the first longitudinal slot is sized and positioned such that the first telescopic beam will insert in the first longitudinal slot when in a collapsed state;
wherein the second longitudinal slot is sized and positioned such that the second telescopic beam will insert in the second longitudinal slot when in a collapsed state;
wherein the first plurality of casters, the stowing berth, the extendable handle, and the plurality of fixed handles attach to the shell;
wherein the shell is a hollow rectangular block structure;
wherein the shell is a semi-rigid structure with an elastic nature;
wherein the shell forms the exterior surfaces of the suitcase;
wherein the shell contains the collapsed rolling telescopic platform;

wherein the shell comprises an anterior face, a posterior face, a superior face, an inferior face, a port face, and a starboard face;
wherein each of the first plurality of casters is a caster attached to the inferior face of the shell;
wherein the first plurality of casters allow the suitcase to roll along a supporting surface during transport;
wherein each of the first plurality of casters are identical;
wherein the stowing berth is a negative space formed in the posterior face of the shell;
wherein the stowing berth forms a cavity that is sized to receive and store the collapsed rolling telescopic platform.

2. The hand-propelled cart according to claim 1
wherein the first lateral slot is a negative space that forms a portion of the stowing berth formed in the posterior face of the shell;
wherein the first lateral slot is a rectangularly shaped structure;
wherein the second lateral slot is a negative space that forms a portion of the stowing berth formed in the posterior face of the shell;
wherein the second lateral slot is a rectangularly shaped structure;
wherein the first longitudinal slot is a negative space that forms a portion of the stowing berth formed in the posterior face of the shell;
wherein the first longitudinal slot is a rectangularly shaped structure;
wherein the second longitudinal slot is a negative space that forms a portion of the stowing berth formed in the posterior face of the shell;
wherein the second longitudinal slot is a rectangularly shaped structure.

3. The hand-propelled cart according to claim 2
wherein the first lateral slot is positioned such that the major axis of the first lateral slot is perpendicular to both the port face and the starboard face of the shell;
wherein the second lateral slot is positioned such that the major axis of the second lateral slot is perpendicular to both the port face and the starboard face of the shell;
wherein the first longitudinal slot is positioned such that the major axis of the first longitudinal slot is perpendicular to both the superior face and the inferior face of the shell;
wherein the second longitudinal slot is positioned such that the major axis of the second longitudinal slot is perpendicular to both the superior face and the inferior face of the shell.

4. The hand-propelled cart according to claim 3
wherein the clip is a cantilever V spring;
wherein the clip mounts in the second lateral slot.

5. The hand-propelled cart according to claim 4
wherein the first plurality of casters comprises a first caster and a second caster;
wherein the first caster mounts on the inferior face of the suitcase such that the first caster is equidistant from both the anterior face and the port face of the suitcase;
wherein the second caster mounts on the inferior face of the suitcase such that the second caster is equidistant from both the anterior face and the starboard face of the suitcase.

6. The hand-propelled cart according to claim 5
wherein the extendable handle is a grip;
wherein the extendable handle is adjustable such that the extendable handle retracts into and extends from the superior face of the shell;
wherein each of the plurality of fixed handles is a loop;
wherein the plurality of fixed handles comprises a first fixed handle, a second fixed handle, and a third fixed handle;
wherein the first fixed handle is a loop structure that mounts on the port face of the shell;
wherein the second fixed handle is a loop structure that mounts on the superior face of the shell;
wherein the third fixed handle is a loop structure that mounts on the starboard face of the shell.

7. The hand-propelled cart according to claim 6
wherein the supporting frame forms the telescopic structure of the rolling telescopic platform;
wherein the supporting frame creates a horizontal surface;
wherein the supporting frame supports the load above the supporting surface such that the load rolls with the suitcase.

8. The hand-propelled cart according to claim 7
wherein the span of the length of the first telescopic beam is adjustable;
wherein the span of the length of the second telescopic beam is adjustable;
wherein the cross brace attaches the first telescopic beam to the second telescopic beam;
wherein the first hinge attaches the first telescopic beam to the suitcase;
wherein the second hinge attaches the second telescopic beam to the suitcase.

9. The hand-propelled cart according to claim 8
wherein the clip mounts in the second lateral slot such that the cross brace inserts into the clip when the collapsed rolling telescopic platform is stored in the stowing berth;
wherein the clip acts as a spring that holds the cross brace in position when the rolling telescopic platform is in a collapsed and stowed position.

10. The hand-propelled cart according to claim 9
wherein the first telescopic beam further comprises a first arm, a second arm, and a first detent;
wherein the position of the second arm relative to the first arm is held in position using the first detent;
wherein the first arm is a hollow first prism that is further defined with an inner dimension;
wherein the second arm is a second prism that is further defined with an outer dimension;
wherein the first arm and the second arm are geometrically similar;
wherein the outer dimension of the second arm is less than the inner dimension of the first arm such that the second arm telescopically inserts into the first arm.

11. The hand-propelled cart according to claim 10
wherein the second telescopic beam further comprises a third arm, a fourth arm, and a second detent;
wherein the position of the fourth arm relative to the third arm is held in position using the second detent;
wherein the third arm is a hollow first prism that is further defined with an inner dimension;
wherein the fourth arm is a second prism that is further defined with an outer dimension;
wherein the third arm and the fourth arm are geometrically similar;
wherein the outer dimension of the fourth arm is less than the inner dimension of the third arm such that the fourth arm telescopically inserts into the third arm.

12. The hand-propelled cart according to claim 11
wherein the first hinge is a pivoting fastener that attaches the first arm of the first telescopic beam to the shell;

wherein the second hinge is a pivoting fastener that attaches the third arm of the second telescopic beam to the shell;

wherein the first hinge attaches the first arm in the stowing berth at the brink formed by the posterior face and the inferior face of the shell such that the rolling telescopic platform rotates into and out of the stowing berth;

wherein the second hinge attaches the third arm in the stowing berth at the brink formed by the posterior face and the inferior face of the shell such that the rolling telescopic platform rotates into and out of the stowing berth;

wherein the cross brace is a shaft;

wherein the cross brace attaches the first arm of the first telescopic beam to the third arm of the second telescopic beam.

13. The hand-propelled cart according to claim 12 wherein each of the second plurality of casters are identical;

wherein each of the second plurality of casters are identical to each of the first plurality of casters;

wherein the second plurality of casters comprises a third caster and a fourth caster;

wherein the third caster mounts on an inferior face of a lateral plate such that the third caster is between a port side of the lateral plate and the fourth caster;

wherein the fourth caster mounts on an inferior face of the lateral plate such that the fourth caster is between a starboard side of the lateral plate and the third caster.

14. The hand-propelled cart according to claim 13 wherein the aft guard comprises the lateral plate, a longitudinal plate, and a hinge spring;

wherein a third hinge is a pivoting fastener that attaches the longitudinal plate to the lateral plate such that the longitudinal plate rotates towards and away from the lateral plate;

wherein the lateral plate is a rectangularly shaped plate that attaches the second plurality of casters to the longitudinal plate;

wherein the longitudinal plate is a rectangularly shaped plate;

wherein the lateral plate attaches to the second arm of the first telescopic beam and the fourth arm of the second telescopic beam such that the major axis of the lateral plate is perpendicular to the center axes of the first telescopic beam and the second telescopic beam;

wherein the lateral plate attaches to the ends of the second arm and the fourth arm that are distal from the shell.

* * * * *